Nov. 14, 1967 W. E. BLAKE 3,352,403
DEVICES FOR ACCELERATING AND TIMING ARTICLES
Filed July 12, 1966 12 Sheets-Sheet 1

INVENTOR
William Edward Blake
BY Howard G. Russell
his ATTORNEY

Nov. 14, 1967       W. E. BLAKE       3,352,403

DEVICES FOR ACCELERATING AND TIMING ARTICLES

Filed July 12, 1966

INVENTOR.
William Edward Blake
BY
Howard G. Russell
his ATTORNEY

United States Patent Office 3,352,403
Patented Nov. 14, 1967

3,352,403
DEVICES FOR ACCELERATING AND TIMING ARTICLES
William E. Blake, Bristol, England, assignor to Kliklok Corporation, New York, N.Y., a corporation of Delaware
Filed July 12, 1966, Ser. No. 564,584
3 Claims. (Cl. 198—34)

ABSTRACT OF THE DISCLOSURE

The present improvements are directed to devices for conveying, accelerating and timing rectangular articles of the type employing a fast moving friction type conveyor and two slower moving lateral conveyors whose staggered lugs intercept, and at a certain point release the articles to a faster moving carrying-out conveyor. The articles move between two driven lateral belts which define a track which is wider than the articles by about the depth to which a lug intrudes into the track space, the length of the track space accommodating at least one and never more than three lugs at any one time, which results in a compact overall length of the device.

---

This invention relates to improvements in conveying devices for accelerating and timing articles, the devices being of the type in which an article, such as a folding box, or a tray, is moved on a track between two laterally disposed timing conveyors fitted with lugs, of which a certain lug of one conveyor forms a forward abutment for a certain article and the next succeeding lug of the other conveyor bears against the side of said article and urges it toward the one conveyor.

Representative forms of conveying devices of the aforementioned type are disclosed and claimed in the prior patent to Frank M. Lefief 2,840,224, dated June 24, 1958.

The copending patent application Ser. No. 547,366, filed May 3, 1966, also relates to a device of the aforementioned type.

In the operation of these devices difficulties are sometimes encountered which appear to be a direct or indirect result of the lateral friction which an article encounters under the force exerted by the conveyor lug bearing against its side.

Differently finished kinds of paperboard such as plain, wax coated, polyethylene coated, etc. paperboard exhibit different degrees of surface friction when boxes made from the board are slid along guide surfaces, such as laterally disposed guide rails which define between them the track along which the articles move.

A further variable factor is encountered in devices in which the width of the track is adjustable. Assuming that the articles to be handled are folding boxes, a setting of the track width which deviates only slightly from the optimum, a matter of one or a few millimeters, may cause the laterally experienced friction to increase by one hundred percent.

The present invention provides a pair of lateral track-defining driven belts beyond which the lugs of the timing conveyors protrude inwardly. These lateral belts perform a multiple function. Not only do they eliminate the effects of non-uniform friction under the laterally exerted force of the conveyor lugs which bear against the article side, but they also serve to urge the article against the lug which acts as the forward indexing abutment. Further, the lateral belts may be employed for accelerating the articles immediately after their release by the indexing lug.

These and other objects, features and advantages of this invention will appear more fully from the detailed description which follows accompanied by drawings showing, for the purpose of illustration, a preferred embodiment of the invention. The invention also resides in certain new and original features of construction and combination of elements hereinatfer set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1:
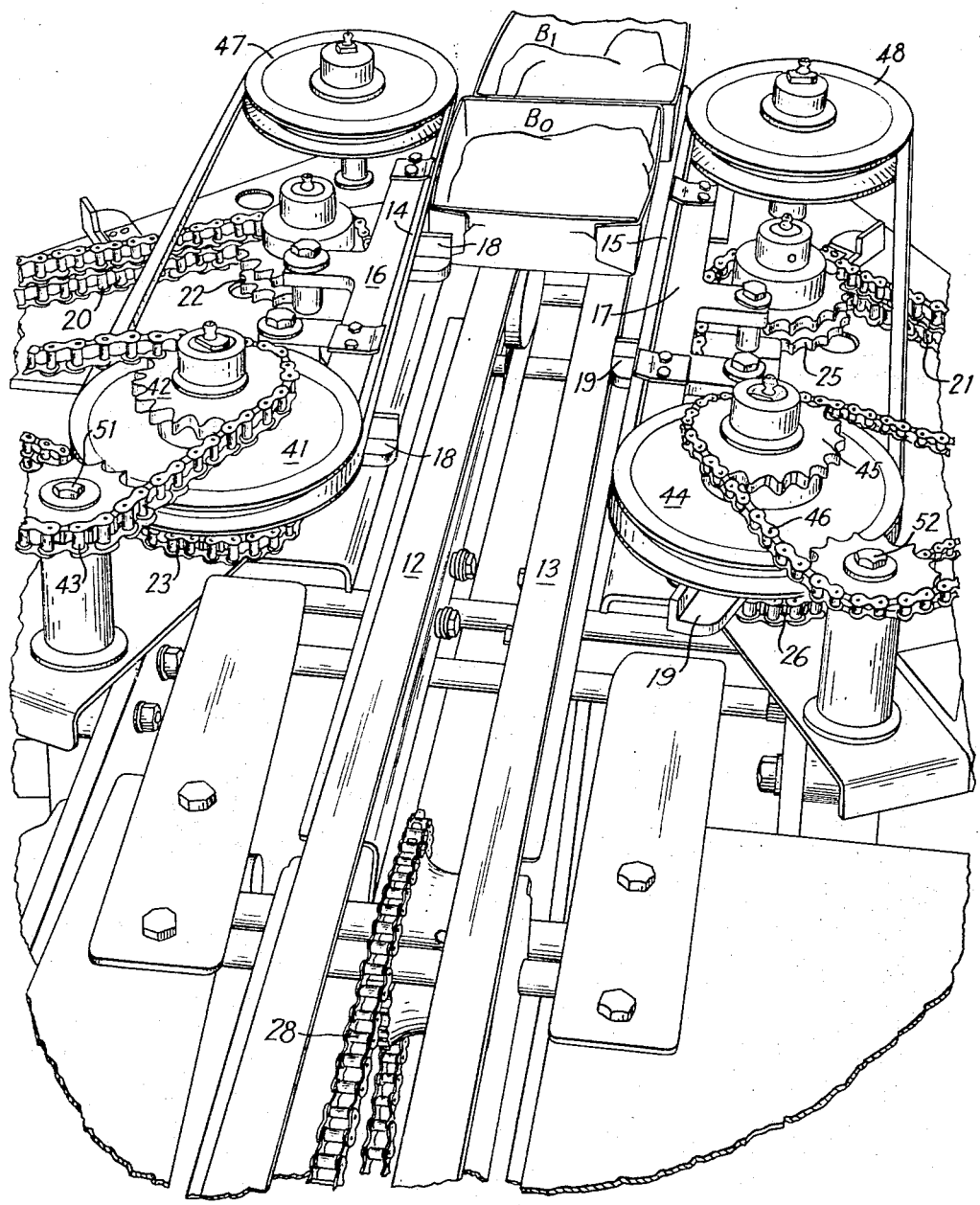
FIG. 1 is a perspective view from above of the receiving end of the conveying device.

In the following description and in the claims various details will be identified by specific names for convenience. The names, however, are intended to be generic in their application. Corresponding reference characters refer to corresponding parts in the several figures of the drawings.

The drawings accompanying and forming part of this specification disclose certain specific details of the invention for the purpose of explanation of broader aspects, but it is understood that the details may be modified in various respects without departure from the principles of the invention and that the invention may be applied to other structures than the one shown.

Figure 9:
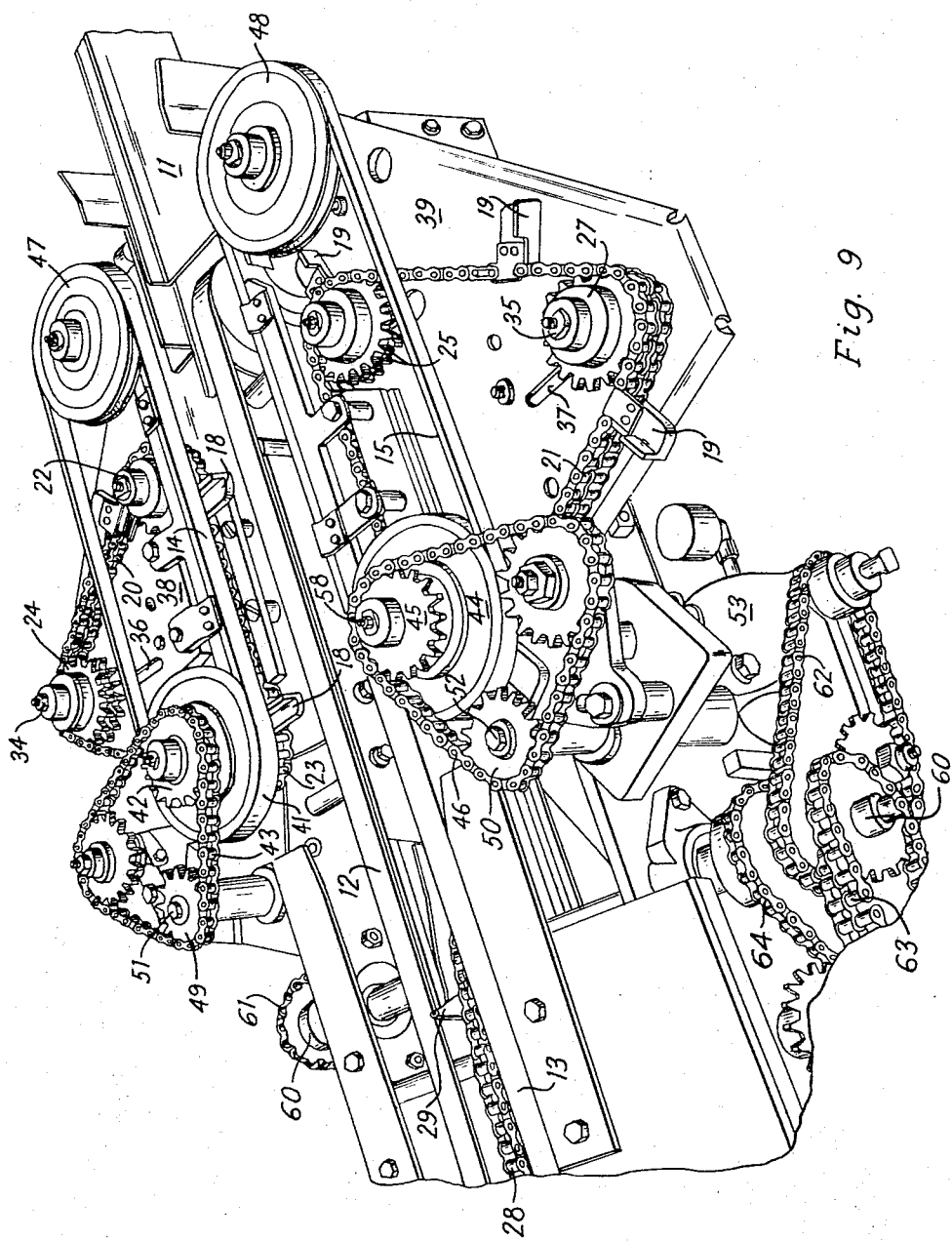
FIG. 9 is a perspective view of the conveying device showing all the essential elements of its drive mechanism.

Referring to FIG. 1, a row of filled folding boxes $B_0$, $B_1$, $B_2$, etc., arrive at the conveying device untimed and unspaced, for example by way of a chute 11 which is best seen in FIG. 9, and are frictionally engaged at their bottoms by a pair of belts 12 and 13 running at the same linear velocity towards the observer. The box path or track is laterally limited by a pair of endless belts 14, 15 backed up against deflection towards the outside by belt guides 16, 17. The lateral belts 14, 15 are so adjusted as to define between them a box track of a width equal to the width of the box plus the distance by which one of the conveyor lugs 18, 19 protrudes into the track. This dimensional relationship is particularly well visible in FIG. 2.

The lugs 18 and 19 are carried by chains of timing conveyors 20, 21. These timing chains run preferably on a triangular course by reason of being trained around three sprocket wheels 22, 23, 24 for chain 20 and 25, 26, 27 for chain 21. The sprocket wheels 24 and 27 are not visible in FIGS. 1 to 6, as they lie outside the boundaries of the illustrations, but are shown in FIG. 9.

The reason for the triangular course of the conveyors will be explained later. Suffice it to state at this point that the base of each triangle is parallel to the path of the bottom conveyor 12, 13 and parallel to the center line of the box track defined by the lateral belts 14, 15.

The linear velocity of the bottom conveyor 12, 13 is greater than the linear velocity of the timing conveyors 20, 21. As a result, the first box $B_0$ moves against one of the timing lugs, which happens to be a lug 18 of the left conveyor 20 in the illustrated instance.

In order to make certain that each box runs into one or the other of the timing lugs 18 or 19, the lugs are staggered so that one lug at one side becomes a movable indexing stop for a particular box, while the next lug on the other side pushes the box over towards the one side to enforce the engagement with the indexing stop.

Figure 2:
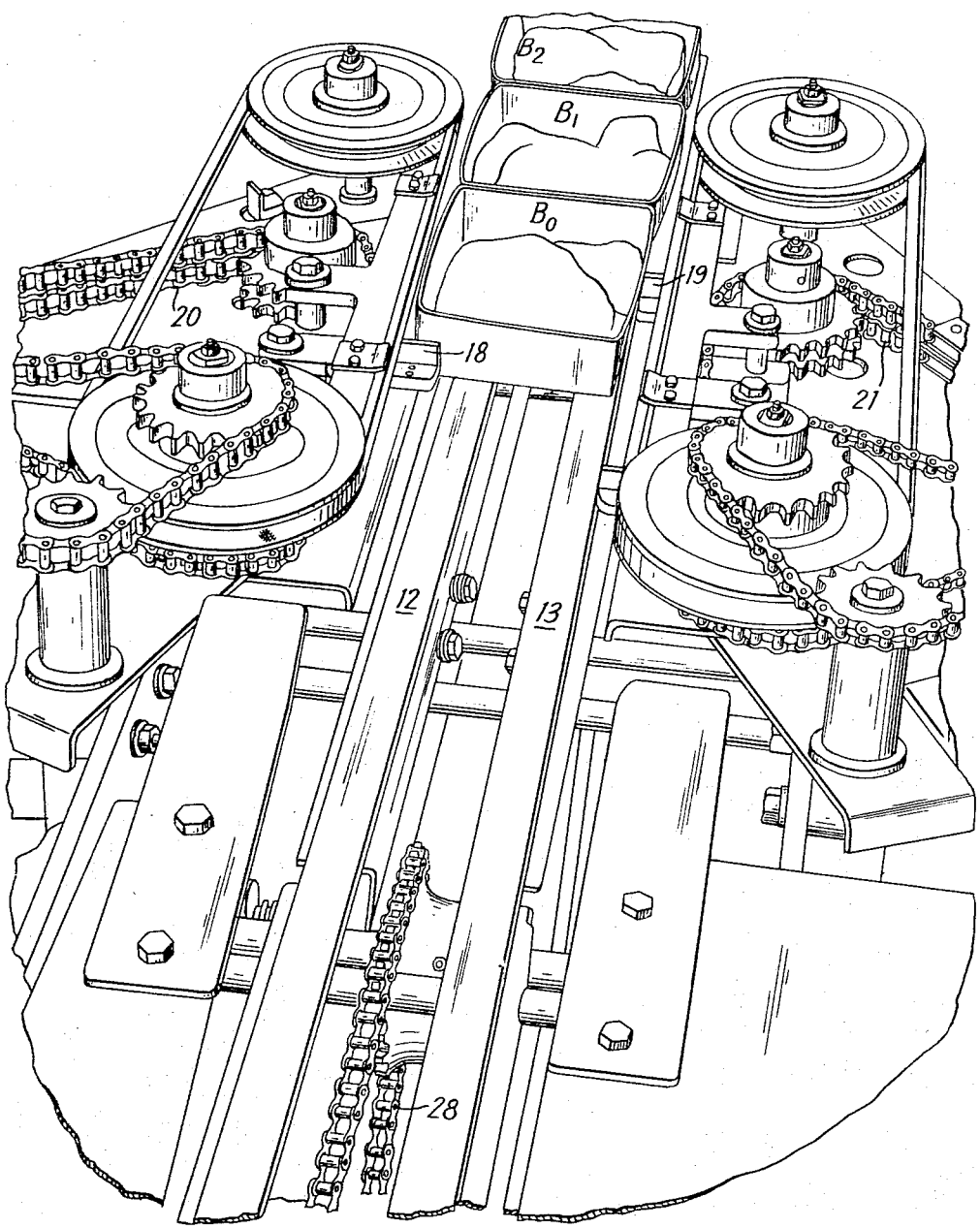
FIGS. 2 to 6 are perspective views of the device illustrating successive phases of operation, all the views 1 to 6 being "upstream"

This is particularly well visible in FIG. 2 where lug 19 forces the box $B_0$ over to the left, so that lug 18 becomes the indexing stop for box $B_0$. Succeeding illustrations will show that the next box $B_1$ will be displaced to the right, box $B_2$ to the left, and so forth.

The spacing of the lugs of any one lateral conveyor is such that the distance 18—18 or 19—19 is greater than the box length, but less than double the box length. The reasons for this arrangement will be discussed later in connection with the velocities of the several lugs, chains and belts.

The foregoing makes it clear that the box $B_0$ travels towards the observer at a velocity equal to that of the chain 20 and its lugs (considering the lug velocity on a straight path). The bottom conveyor 12, 13 and the lateral belts 14, 15 move slightly faster than the chain 20, thus maintaining box $B_0$ tightly against lug 18.

Figure 3:
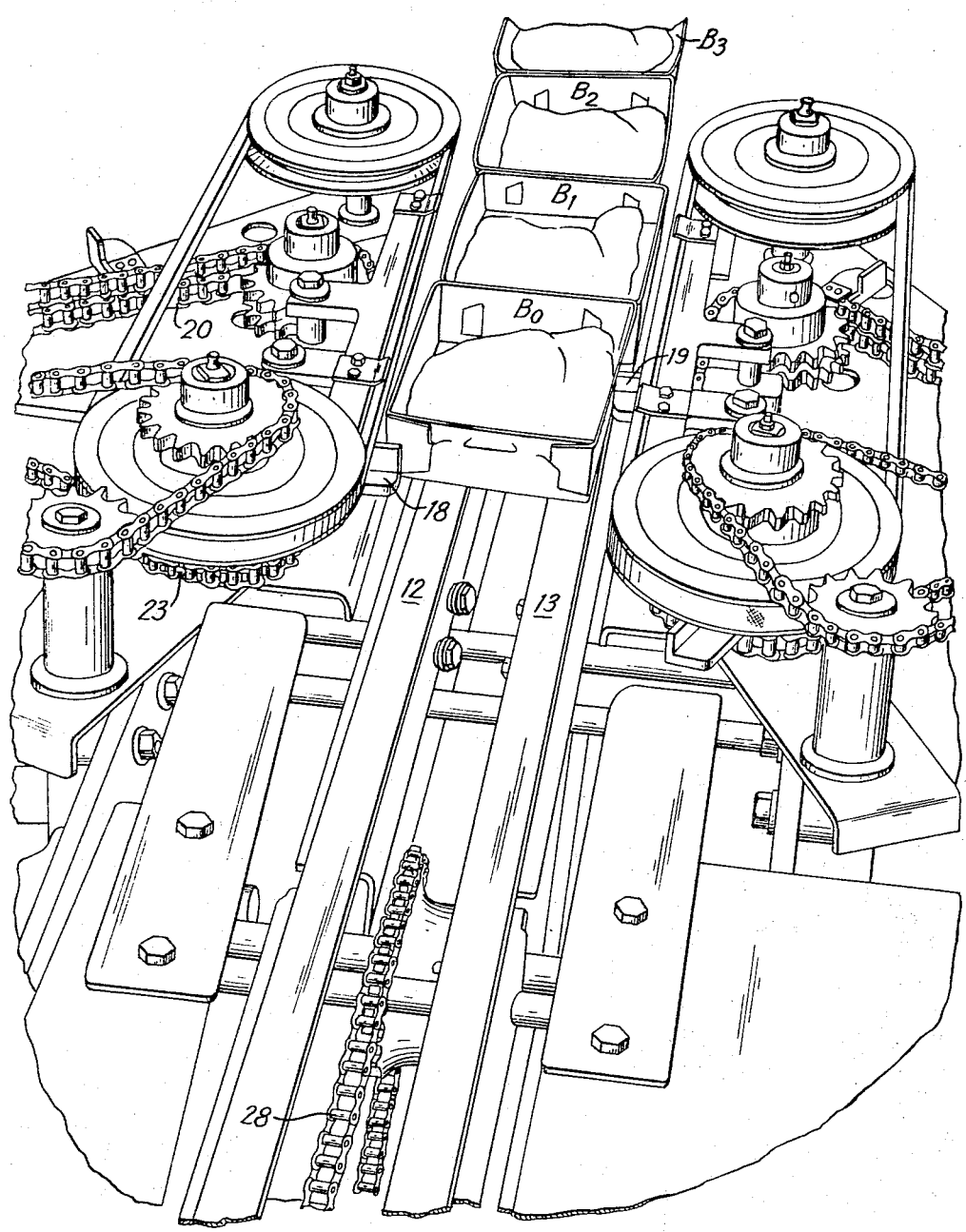

In the position shown in FIG. 3 the lug 18 is about to enter a curved path around the sprocket wheel 23 and out of the box track in order to release box $B_0$.

Box $B_1$ is tight against the end of box $B_0$, but it will be noticed that the right lug 19 is some distance in front of box $B_1$ and the latter must catch up with the lug 19 in order to be released thereby at the properly timed moment.

Figure 4:
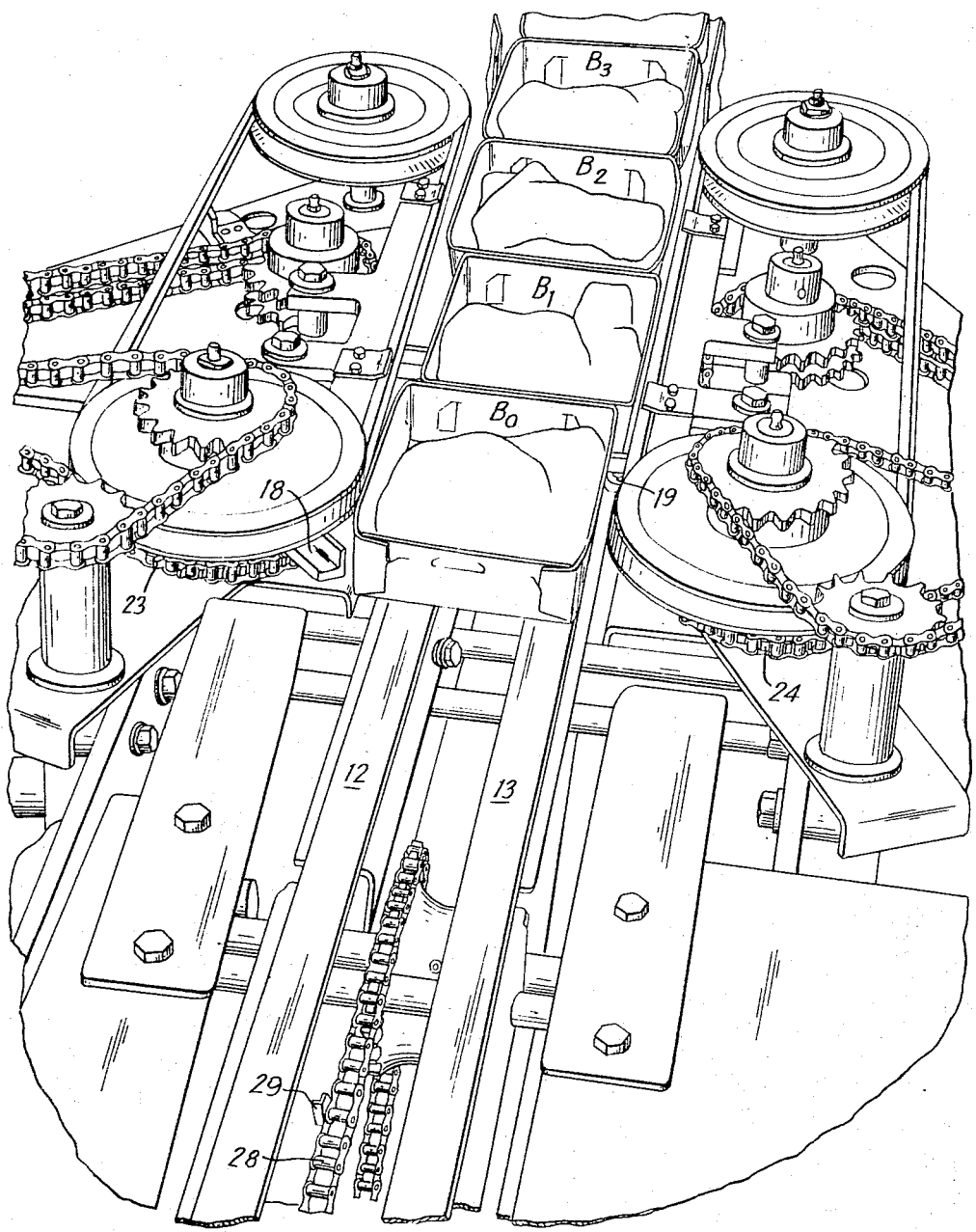

When the lug 18 moves out of the box track its velocity temporarily increases, as it moves on an arc of larger radius than its chain 20. The accelerated lug thus lifts off the leading wall of the box and the box continues to travel at the velocity of the bottom conveyor. This is illustrated in FIG. 4. It should be noted that the lug 18 does not pull laterally away from the box, but that it lifts itself off, thereby avoiding a deflection of the box $B_0$ to the right of the box track (viewing the deflection with respect to the box travel along its track).

Figure 5:
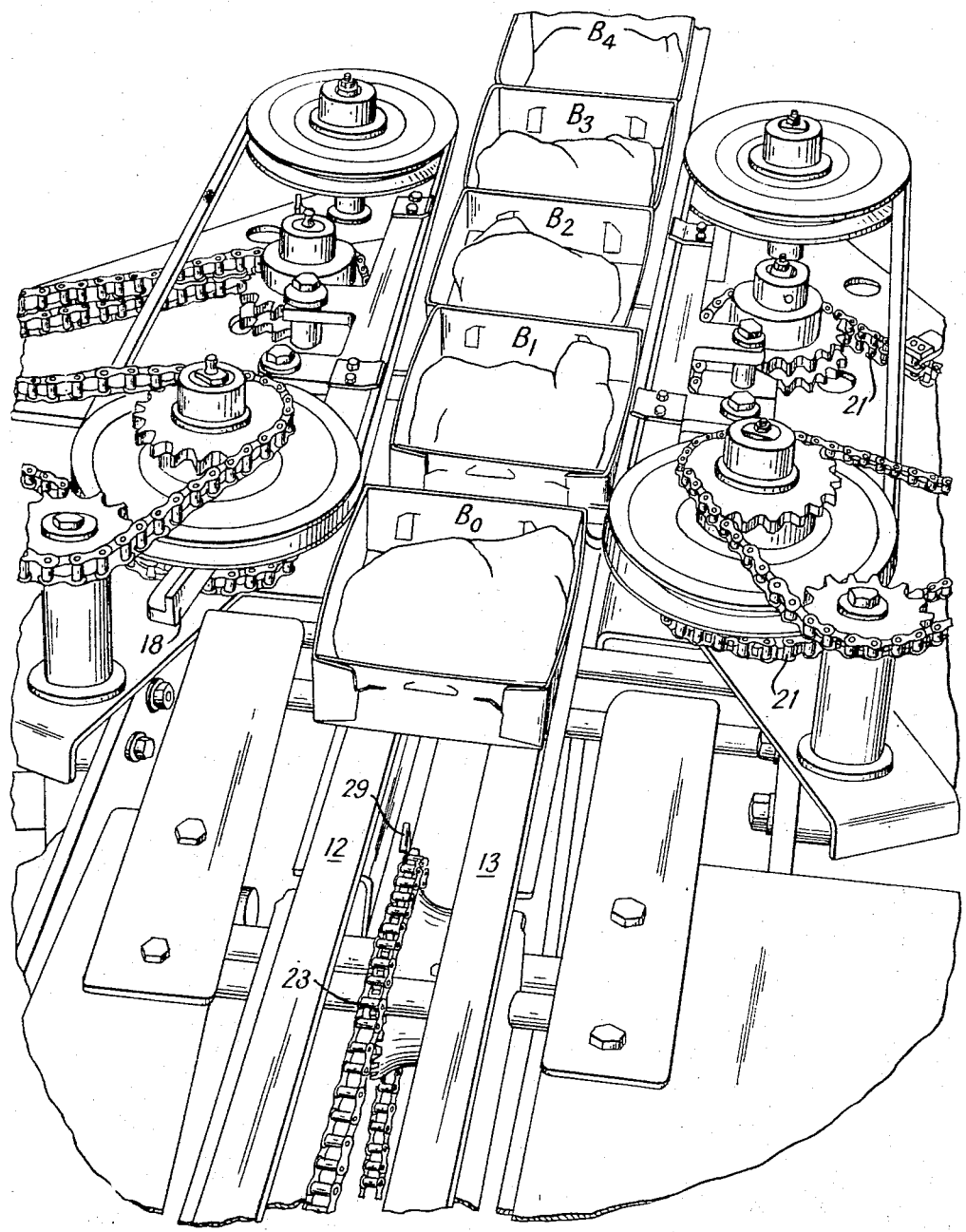

The box $B_0$ is now accelerated by the bottom conveyor 12, 13 and by the belts 14 and 15. Box $B_1$ follows until it is arrested by the lug 19 of the timing conveyor 21, whereafter a separation takes place between the boxes $B_0$ and $B_1$ (FIG. 5).

Figure 6:
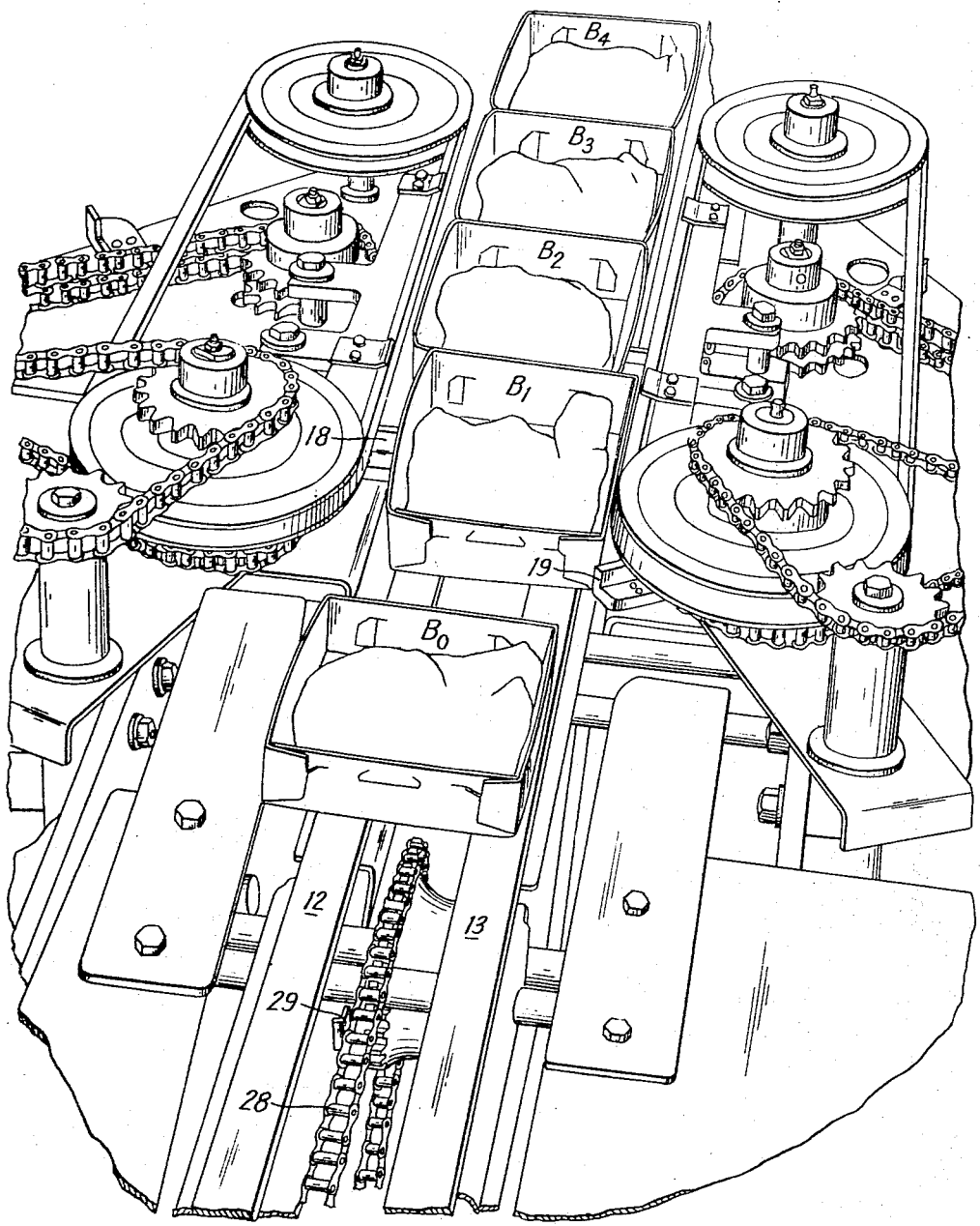

In the position shown in FIG. 6 the lug 19 is withdrawing from the box $B_1$, whereafter $B_1$ follows $B_0$ at a predetermined interval. Release of the box $B_1$ causes box $B_2$ to advance into contact with the next lug 18 and the operation is repeated. Box $B_2$ then assumes about the position of $B_1$ in FIG. 3.

The timed and spaced boxes move toward the observer into engagement with a further conveyor which times and spaces the boxes even more accurately and performs its function positively, i.e., without dependence on frictional advancement.

Figure 7:
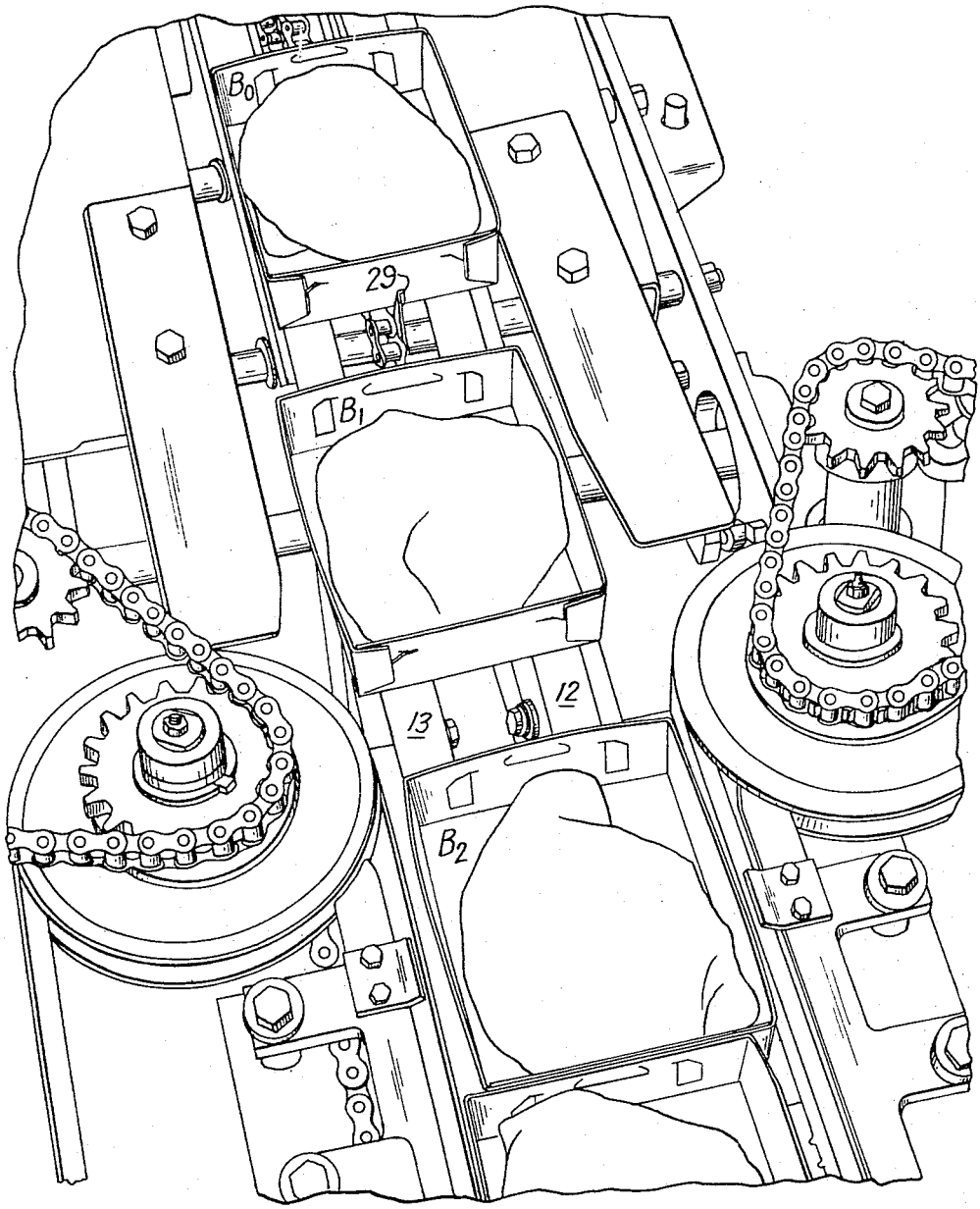
FIG. 7 is a perspective "downstream" view of the device showing boxes carried away in spaced relationship.

The outfeed conveyor 28 is seen in FIGS. 1 to 6 and carries lugs 29 (FIGS. 4 and 6) adapted to engage the trailing wall of the boxes. The outfeed conveyor travels at a higher linear velocity than the bottom conveyor 12, 13 and the belts 14, 15. Its lugs 29 accordingly catch up with the separated boxes and carry them away, for example to a box closing and sealing mechanism. FIG. 7 is a view looking downstream and shows lug 29 in engagement with box $B_0$.

Figure 8:
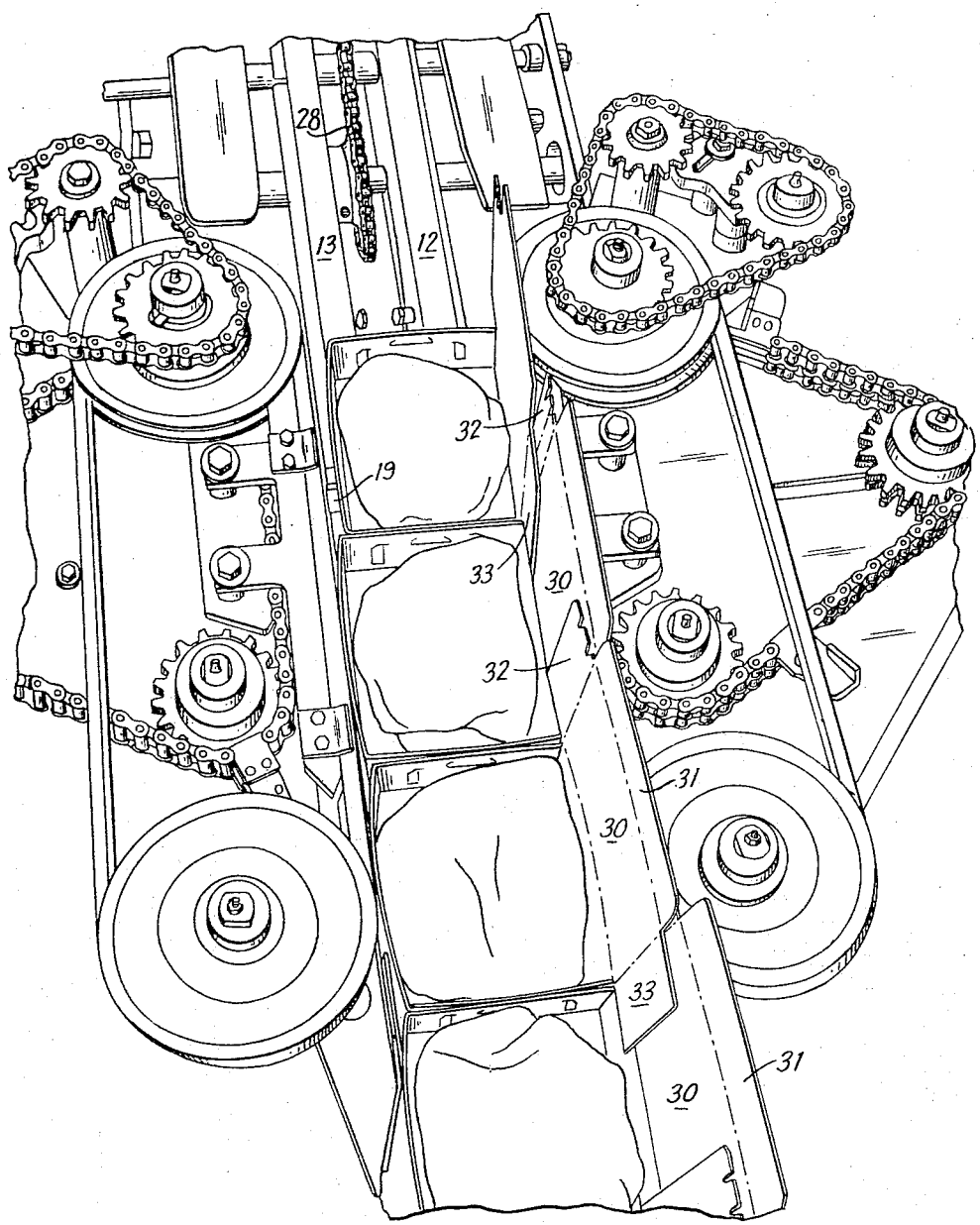
FIG. 8 is a perspective view from above illustrating the operation of the conveying device on folding boxes whose covers are irregularly entangled.

For the sake of clarity the boxes are shown without their hinge covers in FIGS. 1–7. The covers were cut off to expose machine details. In actual practice the boxes may have hinge covers, as shown in FIG. 8. The illustrated hinge covers comprise a main panel 30 to which a front flap 31 and side flaps 32, 33 are articulated. When the boxes are crowded end to end the covers become entangled, because the leading cover side flap 32 overlaps the trailing flap 33 of the next box and even a portion of its main panel 30.

This entanglement of the cover panels, however, does not prevent the boxes from shifting laterally under the action of the timing lugs. The first box on the left, for example, is clearly displaced by the action of the lug 19, even though its trailing flap 33 lies in front of the flap 32 of the next box. The cover panels and flaps simply flex under the force exerted upon the box by the timing lugs (19 in this instance).

With the benefit of the understanding of the operation of the conveying device, it will now be easy to trace its operating mechanism while referring to FIG. 9 showing the device without boxes.

The triangular course of the timing conveyors 20 and 21 is readily seen, as are the three sprocket wheels 22, 23, 24 and 25, 26, 27 around which the conveyors are trained.

The shafts 34, 35 and wheels 24 and 27 are adjustably mounted in slots 36, 37 cut in base plates 38 and 39 of roughly triangular shape. The shafts 34, 35 are clamped in adjusted position by means of knurled hand operable nuts, such as 40 seen in FIG. 10, which is a view of the underside of base plate 39.

Sprocket wheels 22 and 24 of chain 20 and sprocket wheels 25 and 27 of chain 21 are idler wheels, whereas the remaining wheels 23 and 26 (best seen in FIG. 1) are driving.

Wheel 23 is the bottom unit of a stack comprising wheel 23, driving belt pulley 41 and a driven sprocket wheel 42 around which a drive chain 43 is trained. The three units of the stack are keyed together and they rotate together.

A corresponding assembly is found on the other side of the box track. Referring to FIG. 1, there is the wheel 26, a belt pulley 44, and a driven sprocket wheel 45 around which a drive chain 46 extends.

The left pulley 41 drives the belt 14 which is trained over an idler pulley 47. The pulley 44 drives the belt 15 which extends over an idler pulley 48 (FIGS. 1 and 9).

The drive chains 43 and 46 are driven by drive sprocket wheels 49 and 50 mounted on vertical drive shafts 51, 52 extending upwardly from gear boxes driving the shafts 51 and 52 at the same speed, but in opposite directions. Only one gear box 53 is visible in FIG. 9. The other gear box may be seen in FIG. 10 at 59.

The base plates 38 and 39 may be moved closer to or farther away from the bottom conveyor to permit boxes of different width to be handled. A parallelogram type mounting is employed which causes the displacement of the base plates 38, 39 to occur parallel to themselves. This, in turn, insures that the belts 14 and 15 and chains 20 and 21 remain parallel.

Figure 10:
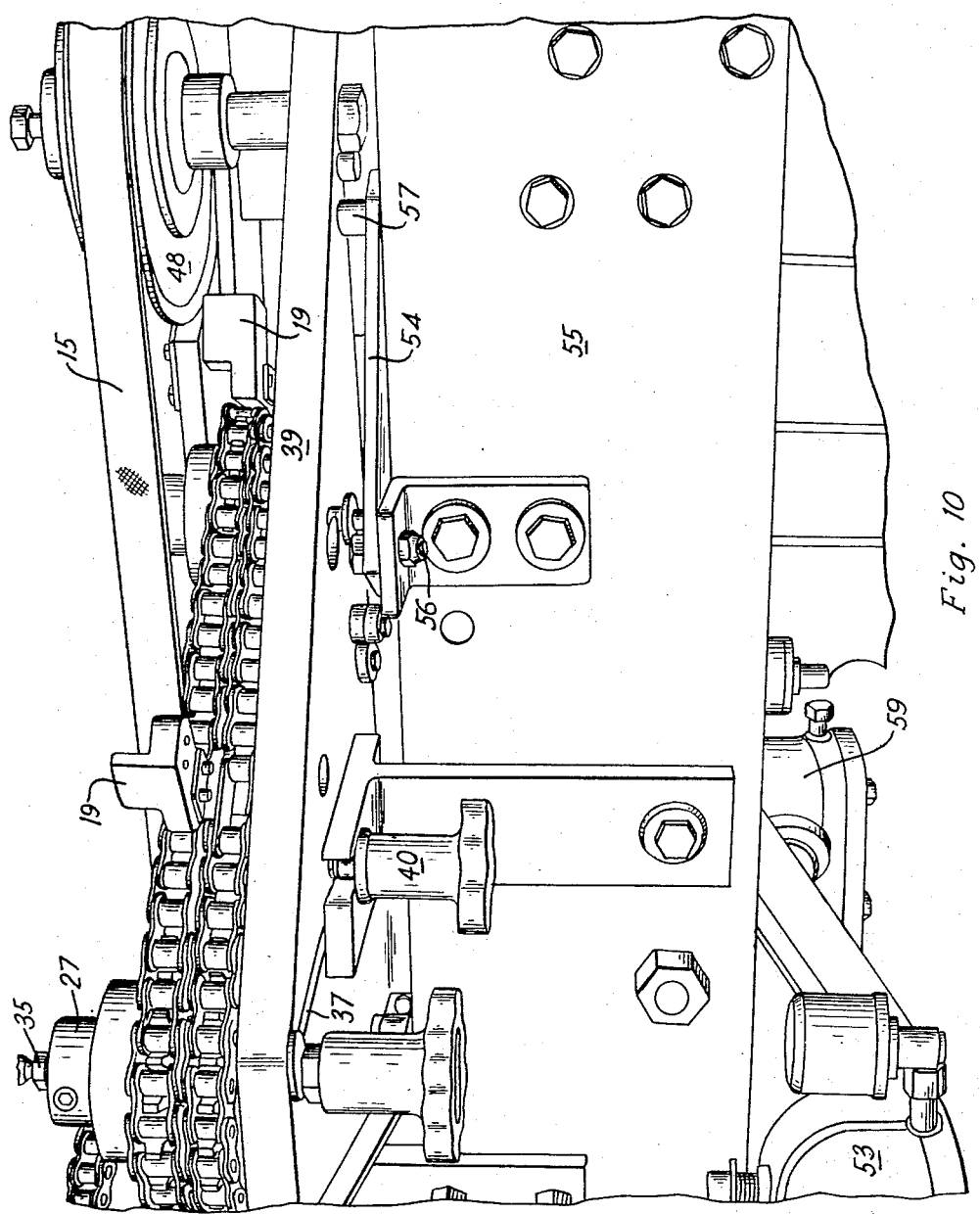
FIG. 10 is a perspective view from below of a portion of the device shown in FIG. 9, FIG. 10 illustrating certain adjusting elements.

Referring to FIG. 10, a link 54 is seen which is pivotally connected to the machine base 55 at 56 and to the base plate 39 at 57. The length of the link 54 measured between its pivot axes is equal to the distance between the drive shaft 52 and the stub shaft 58 in which the stack of wheel and pulley units 45, 44, 26 turns. The base plate 39 may therefore be pulled away from the bottom conveyor (after loosening of the nut 40, FIG. 10), causing the shaft 58 to move on an arc about the drive shaft 52. Simultaneously, the far end of the base plate 39 also swings on an arc about the pivot point 56 (FIG. 10).

A corresponding adjustment and mounting mechanism is provided for the other base plate 38.

The gear boxes 53 and 59 are driven from a main shaft 60 by chains 61 and 62, and the bottom conveyor 12, 13 and the outfeed conveyor 28 are driven by chains 63 and 64.

Figure 11:
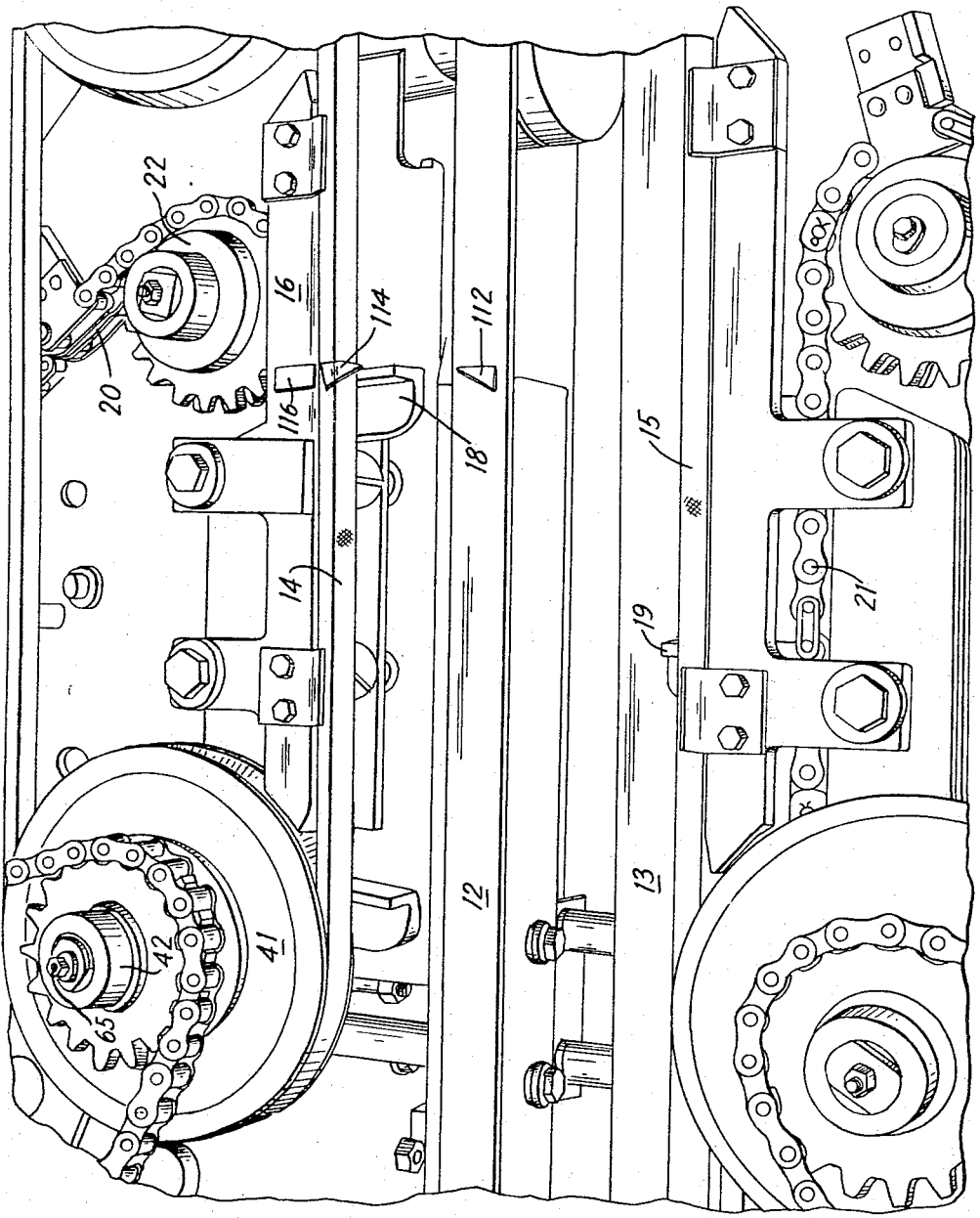
FIGS. 11 and 12 are perspective views of the box track portion of the device illustrating the speed relationship of the various box engaging elements.
Figure 12:
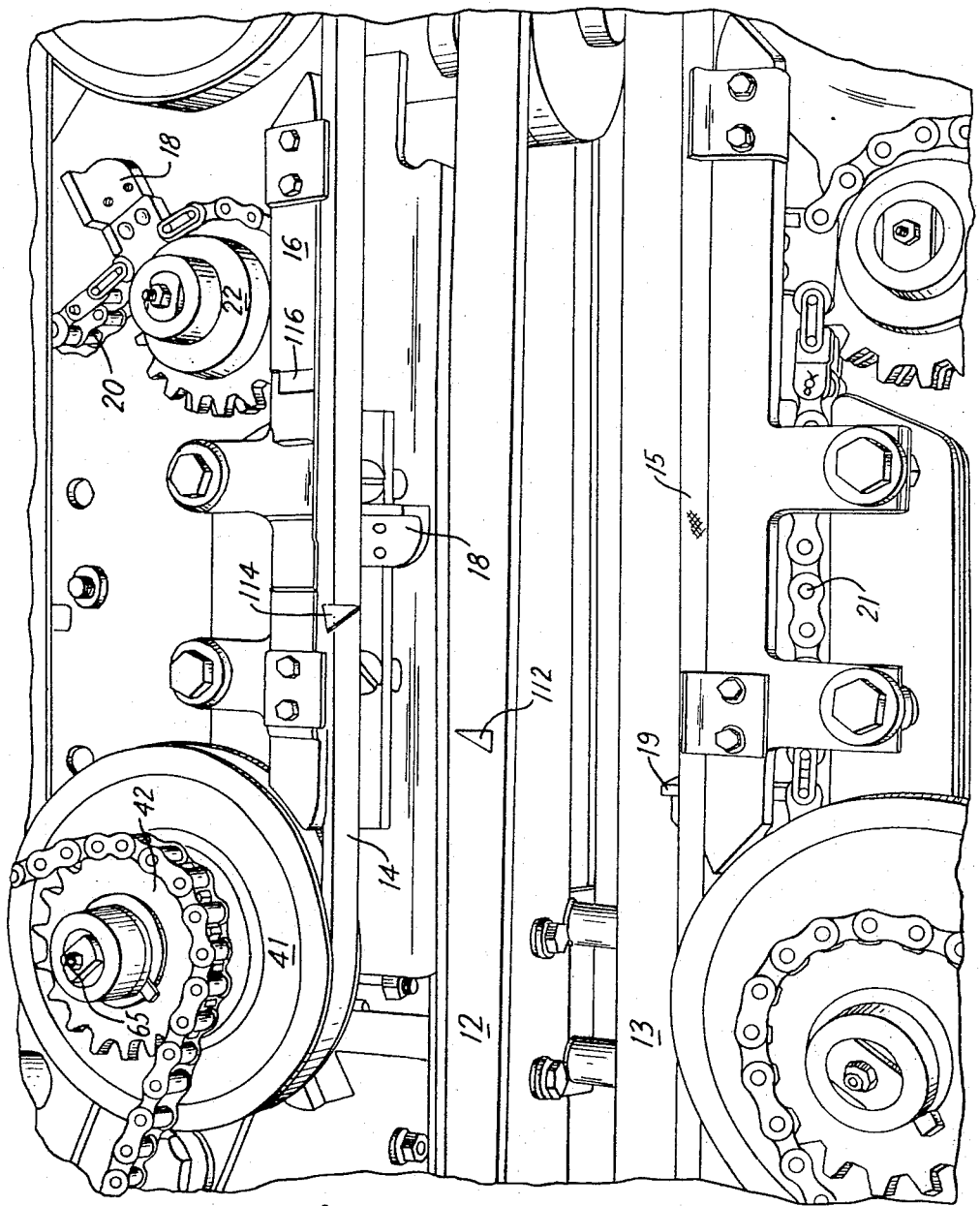

The ratios of transmission and the corresponding velocities are best compared by referring to FIGS. 11 and 12.

In FIG. 11 a marker 116 was attached to the belt guide 16 to serve as a zero mark in line with the position of the lug 18. A marker 114 was attached to the belt 14 and a marker 112 was attached to the bottom conveyor 12, all markers being in register. The conveying device was then operated for a brief moment to cause each of the elements 12, 14 and 18 to advance with respect to the zero mark 116.

FIG. 12 shows the result. It is seen that the velocity of the bottom conveyor 12 is the highest of all the elements, as its marker 112 advanced the farthest. Next in order is the belt 14 and the lowest velocity is that of the lug 18. The numerical ratios can readily be determined by measuring and comparing the relative advances which, measured in millimeters in the photograph from which FIG. 12 was traced, are approximately as follows: 28:47:73.

When it is necessary to convert the device to boxes of a different width, this is readily accomplished by moving the base plates 38 and 39 farther apart or closer together.

Major changes in box length may require installation of timing conveyors 20, 21 with differently spaced lugs 18, 19. This is readily accomplished by slackening the conveyors by shifting the idler sprocket wheels 24 and 27 and then installing the new chains.

The installation of chains 20, 21 with differently spaced lugs 18, 19 may require installation of new drive sprocket wheels 49, 50 having the appropriate number of teeth to fit the changed lug spacing.

As the total chain length is of necessity a multiple of its lug spacing, the wheels 24 and 27 will be in different positions along their slots 36, 37 for chains of different length.

What is claimed is:

1. A device for accelerating rectangular articles, such as folding boxes supplied to it, to a predetermined velocity and for delivering such articles at such velocity in timed and spaced order, the device comprising, in combination, a bottom conveyor for frictionally engaging and advancing said articles; a pair of lateral belts bordering said bottom conveyor on opposite sides, said belts defining between them a track within which articles on said bottom conveyor are advanced; a pair of endless timing conveyors comprising lugs extending into the space between said belts on one side and the other, respectively, with respect to the track center, the lugs of each timing conveyor being uniformly spaced by less than double the length of the articles to be handled and more than the single length of said articles, the lugs of one timing conveyor being staggered with respect to the lugs of the other timing conveyor, as a result of which one lug on one side lies in advance of a certain article and the next lug on the other side bears against the side of said certain article, the width of the track being such that said next lug presses the article into engagement with the opposite belt; an outfeed conveyor in line with said track and overlapping the terminal portion of said bottom conveyor, said outfeed conveyor comprising lugs extending into the path of boxes for receiving and further advancing articles released by the lugs of said timing conveyors; and drive means for driving said bottom conveyor at a linear rate higher than that of the timing conveyors for driving said belts at a linear rate not less than that of the timing conveyors, and for driving said outfeed conveyor at a rate higher than that of the bottom conveyor.

2. A device for accelerating rectangular articles, such as folding boxes supplied to it, to a predetermined velocity and for delivering such articles at such velocity in timed and spaced order, the device comprising, in combination, a bottom conveyor for frictionally engaging and advancing said articles; a pair of lateral belts bordering said bottom conveyor on opposite sides, said belts defining between them a track within which articles on said bottom conveyor are advanced; a pair of endless timing conveyors comprising lugs extending into the space between said belts on one side and the other, respectively, with respect to the track center, the lugs of each timing conveyor being uniformly spaced by less than double the length of the articles to be handled and more than the single length of said articles, the lugs of one timing conveyor being staggered with respect to the lugs of the other timing conveyor, as a result of which one lug on one side lies in advance of a certain article and the next lug on the other side bears against the side of said certain article, the width of the track being such that said next lug presses the article into engagement with the opposite belt, the length of the portions of the timing conveyors within which portions lugs extend into said track being so selected that no less than one lug of each conveyor extends into said track and no more than a total of three lugs extends into said track at any one time; an outfeed conveyor in line with said track and overlapping the terminal portion of said bottom conveyor, said outfeed conveyor comprising lugs extending into the path of boxes for receiving and further advancing articles released by the lugs of said timing conveyors; and drive means for driving said bottom conveyor at a linear rate higher than that of the timing conveyors for driving said belts at a linear rate not less than that of the timing conveyors, and for driving said outfeed conveyor at a rate higher than that of the bottom conveyor.

3. A device as claimed in claim 2 in which the said lateral belts are driven at a linear speed higher than that of the timing conveyors and less than that of the bottom conveyor.

References Cited

UNITED STATES PATENTS

| | | | |
|---|---|---|---|
| 2,840,224 | 6/1958 | Lefief | 198—34 |
| 3,194,381 | 7/1965 | Sherman | 198—34 |
| 3,231,063 | 1/1966 | Talbot | 198—34 |

EVON C. BLUNK, *Primary Examiner.*

EDWARD A. SROKA, *Examiner.*